Figure 1:
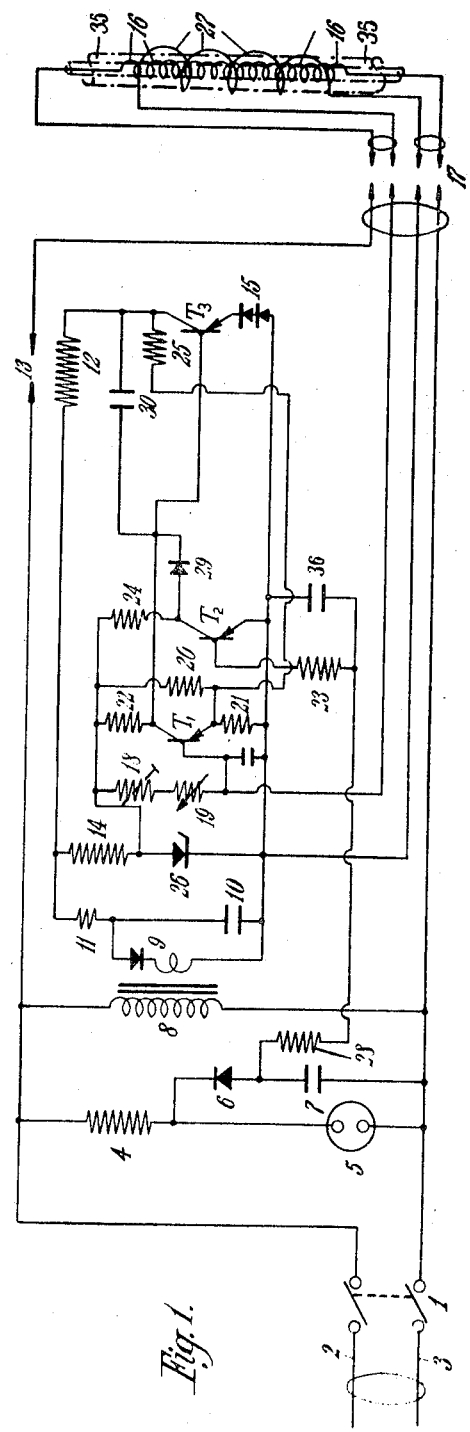

United States Patent

[11] 3,549,865

| [72] | Inventor | Geoffrey Frank Robert Melling<br>Woking, England |
|---|---|---|
| [21] | Appl. No. | 727,576 |
| [22] | Filed | May 8, 1968 |
| [45] | Patented | Dec. 22, 1970 |
| [73] | Assignee | Crater Controls Limited<br>Knaphill, Woking, Surrey, England |

[54] ELECTRIC BLANKET AVERAGE TEMPERATURE AND HOT SPOT CONTROL
7 Claims, 2 Drawing Figs.

| [52] | U.S. Cl. | 219/505 |
|---|---|---|
| [51] | Int. Cl. | H05b 1/02 |
| [50] | Field of Search | 219/504, 505 |

[56] References Cited

UNITED STATES PATENTS

| 2,745,943 | 5/1956 | Safford | 219/505 |
|---|---|---|---|
| 3,385,958 | 5/1968 | Lauck III | 219/505 |

*Primary Examiner*—Bernard A. Gilheany
*Assistant Examiner*—F. E. Bell
*Attorney*—Holman, Glascock, Downing & Seebold ABSTRACT: An electronically controlled electrically heated blanket having a heat control for average temperature and a control for checking localised hot spots. The average temperature control is by a first conductor close to the heating element and the hot spot control by a second temperature sensitive conductor of high specific resistance providing a current path between the element and the first conductor. Suitable electronic switching devices are controlled by changes of temperature of the first and second conductors.

INVENTOR
GEOFFREY FRANK
ROBERT MELLING.
BY
Glascock, Downing + Seebold
ATTORNEYS

ELECTRIC BLANKET AVERAGE TEMPERATURE AND HOT SPOT CONTROL

The invention relates to electrically heated blankets and means for controlling the temperature thereof.

It is to be understood that the blanket hereinafter described and claimed, although particularly adapted for use in a bed, can be so constructed as to be suitable for use, for example, for room heating where positioned under a carpet or other suitable floor covering, and consequently the term "blanket" is to be construed accordingly.

It is common practice to furnish an electrically heated blanket with a thermostatically controlled switch which controls the maximum temperature to which the environment within which the said switch is positioned may rise. For example, if a simple thermostatic switch is incorporated in a blanket which is positioned in a bed, the switch is influenced by the temperature to which that part of the bed is raised and not by the temperature at any other part of the bed. It is possible, with such an arrangement for part of the blanket remote from the switch to rise to excessive temperature if the heat at such a point is prevented from being dissipated at the same rate as adjacent the switch, if, for example, additional bed clothes cover this point.

To overcome such a disadvantage it has been proposed to provide a plurality of thermostatic devices distributed over the blanket, but here again, unless the number is great, one cannot be sure that the proper control is provided, and furthermore this greatly increases the cost of the blanket.

It has also been proposed to provide a conductor adjacent the heating element of the blanket throughout its length and electrically insulated therefrom, the resistance of the conductor being influenced by the temperature produced by the element, and to connect the conductor to a suitable control circuit to switch the current to the element on and off to maintain the blanket at a predetermined average temperature throughout. Although this method of control is satisfactory in maintaining a substantially constant temperature of the blanket generally, it is not influenced to any great extent by the increase above the desired temperature of the blanket locally.

It is possible for the temperature to rise to a dangerous level locally, if, for example, part of the blanket is folded upon itself and at the same time the consequent additional heat produced is prevented from being dissipated, and in addition the element may develop a fault by which the temperature rises locally to an excessive amount and which may cause injury or possibly cause a fire.

The object of the present invention is to provide an electrically heated blanket, the temperature of which is controlled in such a manner as to overcome the disadvantages above referred to.

The invention consists in an electronically controlled electrically heated blanket as hereinbefore defined having a heating element the passage of current through which is controlled by a switching device characterized in that the temperature to which the element may rise is controlled on one hand, by a first conductor which is positioned in close proximity to the said element throughout at least the greater part of its length, the change of temperature of said first conductor being utilized to operate the switching device to control the average temperature to which the blanket may rise generally, and on the other hand, by a second conductor comprising a material of high specific resistance, the value of which changes with change of temperature, and which is in contact with both the said first conductor and the heating element, and which keeps them spaced from one another and forms a high resistance electrical path therebetween, the change of electrical current by way of said path being utilized to operate the switching device to control the maximum temperature to which the blanket may rise locally.

The invention still further consists in a blanket as set forth in the preceding paragraph in which the switching device is operated by an electronically operated control circuit influenced by the electric currents passing through the said first and the said second conductor.

Figure 2:
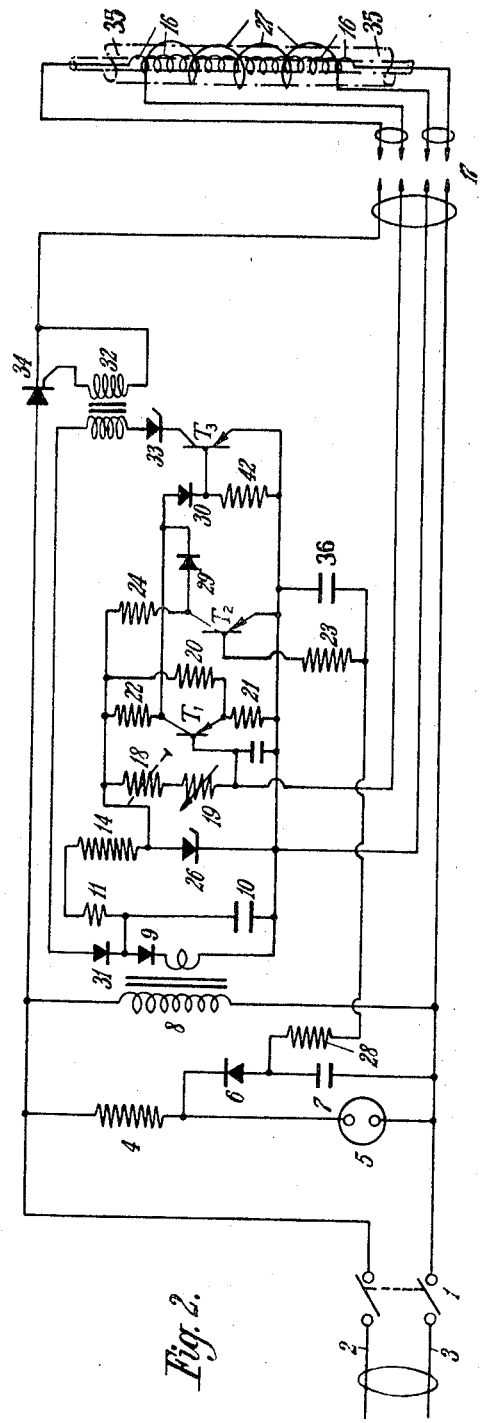

The accompanying drawing shows, by way of example only, two circuit diagrams representing two embodiments of the invention, in which:

FIG. 1 shows a control circuit in which the switching device is a thermal switch, while FIG. 2 shows a control circuit in which the switching device is a silicon controlled rectifier.

The portion of the circuit to the left of the connector 17 represents a control circuit which normally is external of the blanket, while the portion to the right of the connector 17 represents the heating element and conductors contained within the blanket.

The control circuit of FIG. 1 is connected to the main supply by way of double-pole switch 1, the upper connection 2 being to "line" while the lower one 3 is to "neutral." A first DC supply is obtained by rectifying the voltage provided by the potentiometer formed by the resistor 4, and the neon lamp 5, which latter can be used to indicate that the current is on. The current is rectified by a half-wave rectifier 6 and is smoothed by the capacitor 7.

A second DC supply is obtained by providing a stepdown isolating transformer 8, the current from the secondary winding of which is rectified by the rectifier 9 and smoothed by the capacitor 10.

The latter DC supply applies a voltage to the series circuit comprising a limiting resistor 11, the heater 12 of a heat operated bimetallic switch 13, the collector/emitter of the transistor T3 and the biasing diodes 15. The circuit potentials are so chosen that the transistor T3 normally passes a current of sufficient magnitude as to energize the heater 12 and close the contacts of the switch 13. The switch 13 controls the passage of current from the main supply to the heating element 16 of the blanket, by way of the connector 17.

The second DC supply also provides current for a direct coupled DC amplifier comprising transistors T1 and T3 and associated resistors 18 (preset), 19 (adjustable control), 20, 21, 22, 23, 24 and 25. Stabilization of the applied potential is provided by the reference diode 26, and smoothed by capacitor 36.

The heater cable, which includes the element 16, in the form of a spiral, is covered with a layer 35 of material of high specific resistance and upon this is wound a spiral of nickel wire 27 which constitutes the first conductor previously referred to. The nickel wire 27 is covered by a suitable insulating cover.

A potentiometer comprising resistors 18, 19 and nickel wire 27 applies a potential to the base of the transistor T1, said potential being dependent upon the value to which the preset resistor 18 and adjustable temperature control resistor 19 are set and the resistance of the nickel wire 27.

The resistance of the nickel wire 27 varies with change of temperature and being of a positive temperature coefficient, increases with increase of temperature and vice versa. Consequently, as the temperature of the heating element 16 rises, increased potential is applied to the base of transistor T1, for any given setting of the control resistor 19.

Change in the base current of the transistor T1 resulting from the change of values of the potential divider 18, 19 and 27 is amplified by transistor T1 and thereby changes the potential on the base of transistor T3. An increase of current in the base circuit of transistor T1 results in a reduction of the current passing through the heater 12. This in turn results in the cooling of the bimetallic switch 13, and at a predetermined level, the opening of the contact of the switch and the interruption of the current to the heating element.

A subsequent decrease of the base current of transistor T1 results in the raising of the temperature of the heater 12, the closing of the switch 13 and the restoration of the current to the heating element 16.

Changes in the resistance of the nickel wire 27 resulting from temperature changes in the heating cable and its environment cause corresponding changes in the base current of the transistor T1 and hence temperature control is achieved. The level of temperature required is set by means of the adjustable control resistor 19.

The circuit so far described controls the maximum average temperature to which the blanket may rise generally. The part of the circuit which controls the maximum temperature to which the blanket may rise locally, is as follows.

Power for the base current of the transistor T2 is provided by the first rectifier 6 by way of the resistors 28 and 23 which are included to prevent the flow of excessive current under fault conditions. The base/emitter circuit is completed by way to the connector 17 and the interwinding second conductor 35 of high specific resistance in the heating cable.

The base current of this transistor T2 is thus dependent upon the resistance value of the interwinding second conductor 35. This interwinding resistance changes with temperature, being high at low temperature, and reduced at high temperature. However, there is always some current flowing through the second conductor 35 even at normal room temperatures.

Changes in the base current of transistor T2 result in change of collector current through resistor 24 and hence the collector potential. Changes in the collector potential of transistor T2 have no effect on the circuit whilst the collector/emitter potential of transistor T2 is greater than the collector/emitter potential of transistor T1, since under these conditions the diode 29 is reverse biased. When, however, the collector/emitter potential of transistor T2 becomes lower than the collector/emitter potential of transistor T1, the diode 29 is now forward biased and conducts, lowering the base potential of transistor T3. The switching cycle is thus controlled by a combination of the changes in resistance of the nickel wire 27 and the interwinding resistance, namely the second conductor 35.

Under normal operating conditions, the base current of transistor T2 is not of such magnitude as to allow the diode 29 to become forward biased. In the event of localized overheating the base current increases and the diode 29 becomes forward biased. Increased overheating results in the transistor T2 taking complete control of the circuit, and reducing the collector current of transistor T3 to the value when the contacts of switch 13 open.

It is arranged that under all conditions of localized overheating the contacts of switch 13 open at a temperature well below that at which a dangerous or hazardous condition can arise, such as would start a fire.

If the overheating is self generated, for example, by the element becoming folded over, or an arc is produced, the switch 13 will close again when the overheating condition cools, and thereafter the circuit controls the temperature of the overheated area. If the overheating is caused externally and not by heat generated by the element, the switch 13 will remain open, and no further heat will be generated by the blanket. As soon as the cause of the overheating is removed the circuit returns to normal operation and control at the preset temperature is restored.

If, however, there is severe overheating over a very small area, for example, along less than 1 inch of cable, the inter winding layer constituting the second conductor 35 will be damaged and a continuous high base current in transistor T2, will result. Consequently, the switch 13 will remain open even when the heating cable has cooled. This condition is nonreversible and occurs at temperatures in the region of 160°—200° C., this being a safe temperature.

The element 16 being in the center of the heating cable, is protected by the nickel wire helix 27, and thus damage to the cable will result in the short circuiting of the two windings 16 and 17 before the element can become exposed. This short circuiting results in the control circuit opening the contacts of the switch 13 and cutting off the current to the element.

Since the outer winding is isolated from the main supply by the transformer 8 and is operated at low voltage, i.e. less than 50 v. the risk of electric shock is negligible. Any leakage currents from the main supply via the rectifier 6 and capacitor 7 are limited to a safe value by the resistor 28.

A four-core cable incorporating the control elements of the heating cable may be connected between the connector 17 and the control circuit, thus giving similar protection to that given to the heating element right up to the control circuit.

An open circuit in the nickel wire 27 or the lead thereto results in an increase in the base current of transistor T1 and the switch opens, and thus a broken wire or faulty connection fails-safe.

An open circuit in the inner heating element or the connecting leads will result in either the complete breaking of the circuit, i.e. ends not touching, and consequently no heat being produced, or, arcing at the break with localized overheating and consequent operation of the protective circuit for localized overheating, as described above, both of these conditions fail-safe.

In the circuit arrangement shown in FIG. 2 a silicon controlled rectifier is used as the switch device instead of the thermal switch of FIG. 1. The circuit of FIG. 2 is similar to that of FIG. 1, to the left of diode 29, but the transistor T3 functions differently. When the collector/emitter potential of transistors T1 and T2 are high, i.e. the nickel wire 27 is cold, the zener voltage of diode 30 is exceeded and base current flows in transistor T3.

The collector potential of transistor T3 is supplied by the transformer 8 and rectified by diodes 9 and 31, but not smoothed. Thus unidirectional pulses are applied to the series circuit comprising the primary winding of transformer 32, the zener diode 33, and the collector/emitter circuit of transistor T3. When base current flows in transistor T3, and the collector potential of suitable polarity increases, the zener voltage of diode 33 is exceeded, and current flows through the primary of transformer 32. This in turn causes a current pulse to be applied to the gate circuit of the silicon controlled rectifier 34 from the secondary of the transformer 32. This pulse is of such a phase as to cause the silicon controlled rectifier to conduct on appropriate half cycles and current flows in the element 16.

When the collector/emitter potential of transistors T1 and T2 are low, i.e. the nickel wire 27 is hot, no base current flows in transistor T3. Consequently, no collector current will flow in transistor T3 and the transformer 32 will not be energized the silicon controlled rectifier will not conduct and the heating element 16 will not be energized. This action results in control of the temperature of the heating element, as described in relation to FIG. 1.

In a modified circuit, the diode 30 is omitted, with the result that there is a gradual change in the base, and hence the collector current, of the transistor T3. This results in a change of the conduction cycle of the silicon controlled rectifier 34, and progressively increasing or decreasing of the average current in the heating element 16.

The isolating transformer 8 may be replaced by a capacitive potential divider acting as a low potential source for the second DC supply, and also as DC isolation for the "hot spot" protecting circuit.

The outer spiral wire of the heating element for controlling the general heating of the element and comprising the first conductor, has been mentioned above as being of nickel, because this metal has the desired characteristics, but it is to be understood that other metals may be used satisfactorily if desired, the value of the control circuit being varied if necessary.

It is preferred to form the interwinding layer constituting the second conductor 35 of polyvinyl chloride but any other suitable thermoplastic synthetic resins of high specific resistance having the desired change of resistance with change of temperature, with either a negative or positive coefficient may be used.

The first conductor may, instead of being formed of a wire, in the form of a helix or otherwise, be substituted by a thermoplastic synthetic resin, suitably loaded, for example, with carbon to provide the required low specific resistance, and formed as a layer upon the layer of high specific resistance forming the second conductor 35.

It is to be understood that the above description is by way of example only, and that details of carrying the invention into effect may be varied without departing from the scope of the invention.

I claim:

1. Electronically controlled electrically heated blanket having a heating element the passage of current through which is controlled by a switching device characterized in that the temperature to which the element may rise is controlled on one hand, by a first conductor which is positioned in close proximity to the said element throughout at least the greater part of its length, average temperature means being provided to be responsive to the change of temperature of said first conductor to operate the switching device to control the average temperature to which the blanket may rise generally, and on the other hand, by a second conductor comprising a material of high specific resistance, the value of which changes with change of temperature, and which is in contact with both the said first conductor and the heating element, and which keeps them spaced from one another and forms a high resistance electrical path therebetween, maximum temperature means being provided to be responsive to the change of electrical current by way of said path to operate the switching device to control the maximum temperature to which the blanket may rise locally.

2. Electronically controlled blanket as claimed in claim 1 in which the switching device is operated by an electronically operated control circuit influenced by the electrical currents passing through the said first and the said second conductor.

3. Electronically controlled blanket as claimed in claim 1 in which the heating element, the first conductor and the second conductor are combined to form a heating and control cable incorporated in the blanket.

4. Electronically controlled blanket as claimed in claim 3 in which the heating element is in the form of a helix wound upon an insulating core, the second conductor is in the form of a layer of material of high specific resistance upon the heating element, the first conductor is a wire in the form of a helix wound upon the layer of material of high specific resistance, while the cable has an outer cover of insulating material.

5. Electronically controlled blanket as claimed in claim 4 in which the material of high specific resistance is polyvinyl chloride and the wire is of nickel.

6. Electronically controlled blanket as claimed in claim 2 in which the switching device is a thermal switch heated by a heating coil associated with the electronically operated control circuit.

7. Electronically controlled blanket as claimed in claim 2 in which the switching device is a silicon controlled rectifier associated with the electronically operated control circuit.